United States Patent [19]

Horiki et al.

[11] Patent Number: 5,164,238
[45] Date of Patent: Nov. 17, 1992

[54] MASKING MEMBER

[75] Inventors: Seinosuke Horiki; Reiji Makino; Kuninori Ito, all of Tokai, Japan

[73] Assignee: Nagoya Oilchemical Co., Ltd., Japan

[21] Appl. No.: 709,069

[22] Filed: May 30, 1991

Related U.S. Application Data

[63] Continuation of Ser. No. 327,748, Mar. 23, 1989, abandoned.

Foreign Application Priority Data

Mar. 25, 1988 [JP] Japan .............................. 63-40198[U]

[51] Int. Cl.⁵ .................. B65D 65/28; B32B 3/00
[52] U.S. Cl. ........................ 428/43; 428/40;
428/131; 428/137; 428/138; 428/159; 428/167;
428/172; 428/213; 428/314.4; 428/317.1;
428/317.3; 428/352
[58] Field of Search ............... 428/43, 40, 131, 137,
428/138, 159, 167, 172, 213, 314.4, 317.1, 317.3, 352

[56] References Cited

U.S. PATENT DOCUMENTS

| | | | |
|---|---|---|---|
| 4,759,959 | 7/1988 | Guy | 427/282 |
| 4,764,421 | 8/1988 | Horiki et al. | 428/40 |
| 4,822,650 | 4/1989 | Horiki et al. | 428/40 |
| 4,835,026 | 5/1989 | Horiki et al. | 428/40 |
| 4,913,786 | 4/1990 | Horiki et al. | 428/317.3 |

Primary Examiner—William J. Van Balen
Attorney, Agent, or Firm—Cooper & Dunham

[57] ABSTRACT

A masking member presented herein comprises a sheet of a polystyrene foam provided with cutting guide lines so that said masking member consists of a plural number of units of the masking members surrounded with said cutting guide lines wherein said cutting guide lines are discontinuous and consist of a number of small grooves or short penetrating lines or small penetrating holes wherein the total length of said grooves or lines or holes is 20 to 80% of the length of said cutting guide lines. When said masking member is used, said sheet is easily and correctly broken along said cutting guide lines by hand to a piece consisting of one or more units of the masking member to have a proper size and shape corresponding with a part of an article which is necessary to be protected from a surface treatment.

1 Claim, 6 Drawing Sheets

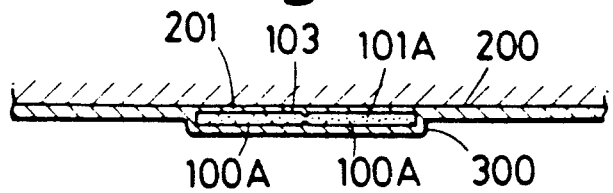
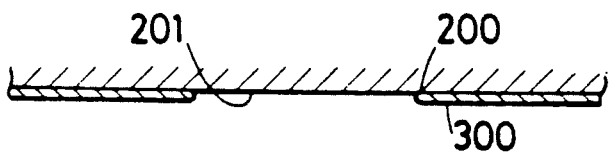
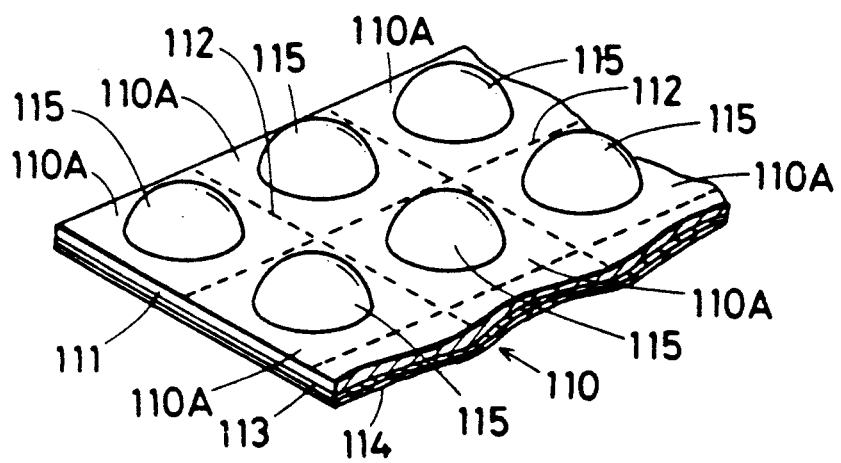
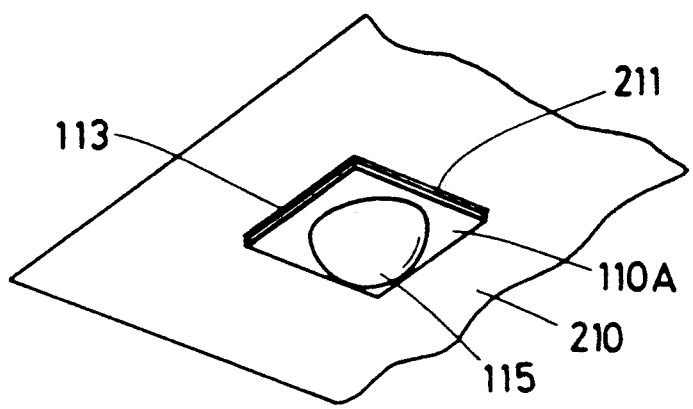

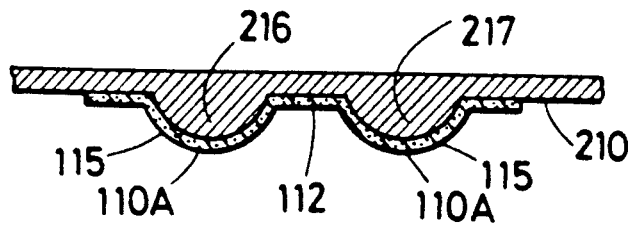
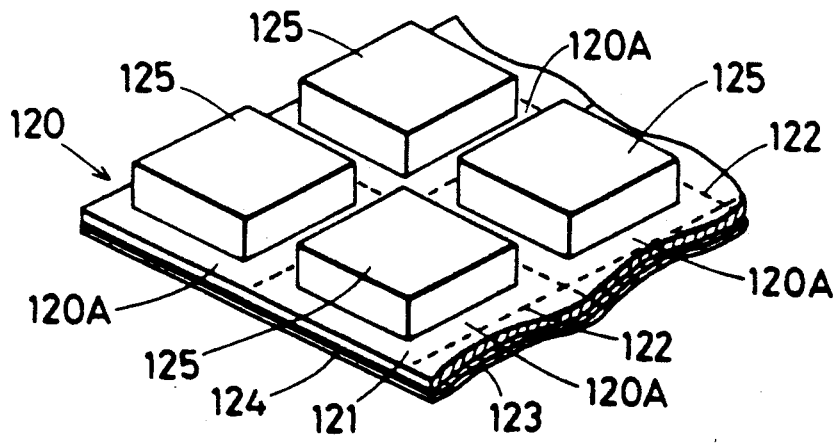
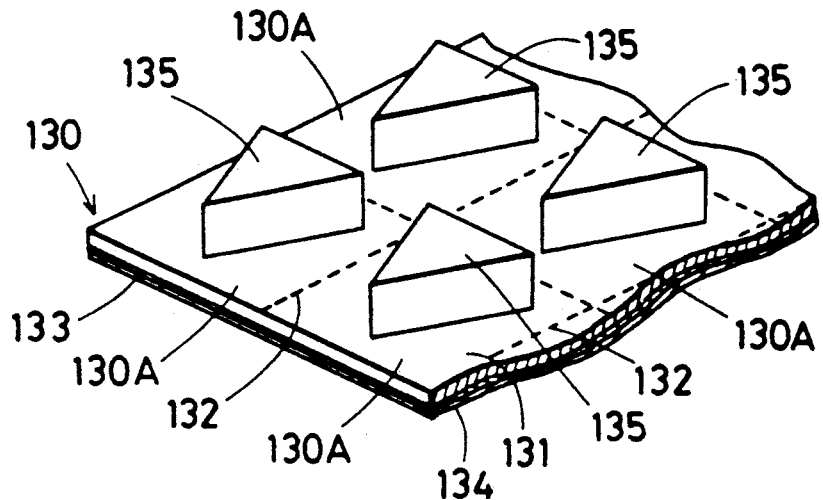

MASKING MEMBER

This is a continuation of application Ser. No. 327,748, filed Mar. 23, 1989 is now abandoned.

FIELD OF THE INVENTION

The present invention relates to a masking member to protect a part of an article from a surface treatment.

More particularly, the present invention relates to a masking member comprising a sheet of a polystyrene foam provided with cutting guide lines so that said masking member consists of a plural number of units of the masking members surrounded with said cutting guide lines wherein said cutting guide lines are discontinuous and consist of a number of small grooves or short penetrating lines or small penetrating holes wherein the total length of said grooves or lines or holes is 20 to 80% of the length of said cutting guide lines.

DESCRIPTION OF THE PRIOR ART

A surface treatment such as coating, plating, phosphatizing and the like is very difficult to effect locally on the surface of an article. Therefore, a masking member is necessary to protect part(s) of said article to avoid to effect of said surface treatment on said part(s). Hitherto, a masking member comprising a sheet of a polystyrene foam provided with cutting guide lines has been presented (U.S. Pat. No. 4,764,421).

When said masking member is used, said sheet is broken along said cutting guide lines by a worker's hands to a piece consisting of one or more units of the masking member to have a proper size and shape corresponding with a part of an article which is necessary to be protected from a surface treatment. It may be especially very important for the masking process in a continuous mass production line, such as the masking process in the coating line of the underside of a car body, that said masking member is easily and correctly broken along said cutting guide lines by hand. In said coating line of the underside of a car body, to one's surprise, a few hundred parts must be protected by such masking members. This shows clearly now important the easiness of breaking the masking member along said cutting guide lines is for a continuous mass production line. On the other hand, said masking member should not break along said cutting guide lines during operations such as transportation, storage, and the like.

SUMMARY OF THE INVENTION

Accordingly, an object of the present invention is to present a masking member which is easily and correctly broken along its cutting guide lines when said masking member is used.

A further object of the present invention is to present a masking member which is prevented from breaking along said cutting guide lines during operations such as transportation, storage, and the like.

A still further object of the present invention is to carry out the masking process smoothly.

Briefly, said objects of the present invention can be attained by a masking member comprising a sheet of a polystyrene foam provided with cutting guide lines so that said masking member consists of a plural number of units of the masking member surrounded with said cutting guide lines wherein said cutting guide lines are discontinuous and consist of a number of small grooves or short penetrating lines or small penetrating holes wherein the total length of said grooves or lines or holes is 20 to 80% of the length of said cutting guide lines. Said masking member may be easily snapped along said cutting guide lines by a worker's hands when said masking member is used while the breaking of said masking member along said cutting lines may be prevented during operations such as transportation, storage, and the like.

BRIEF DESCRIPTION OF THE DRAWINGS

FIGS. 1 to FIG. 5 show the first embodiment of the present invention.

FIG. 1 is a partial perspective view of the masking member.

FIG. 2 is a partial side sectional view of the masking member.

FIG. 3 is a partial perspective view after the masking member has been attached.

FIG. 4 is a partial side sectional view after coating.

FIG. 5 is a partial side sectional view after the masking member has come off an article.

FIGS. 6 to FIG. 12 show the second embodiment of the present invention.

FIG. 6 is a partial perspective view of the masking member.

FIG. 7 is a partial perspective view after the masking member has been attached.

FIG. 8 is a partial perspective view when the masking member is stripped from an article.

FIG. 9 is a partial side sectional view after the masking member has been attached in a hole of an article.

FIG. 10 is a partial side sectional view after the masking member has been attached on a projection of an article.

FIG. 11 is a partial side sectional view after the masking member has been attached in two holes of an article.

FIG. 12 is a partial side sectional view after the masking member has been attached on two projections of an article.

FIG. 13 is a partial perspective view of the masking member of the third embodiment of the present invention.

FIG. 14 is a partial perspective view of the masking member of the fourth embodiment of the present invention.

FIG. 15 is a partial perspective view of the masking member.

FIG. 16 is a partial side sectional view after the masking member has been attached.

FIG. 17 is a partial side sectional view of the masking member.

FIG. 18 is a partial side sectional view after the masking member has been attached.

FIG. 19 is a partial perspective view of the masking member.

FIG. 20 is a partial side sectional view after the masking member has been attached.

DETAILED DESCRIPTION

Figure 1:
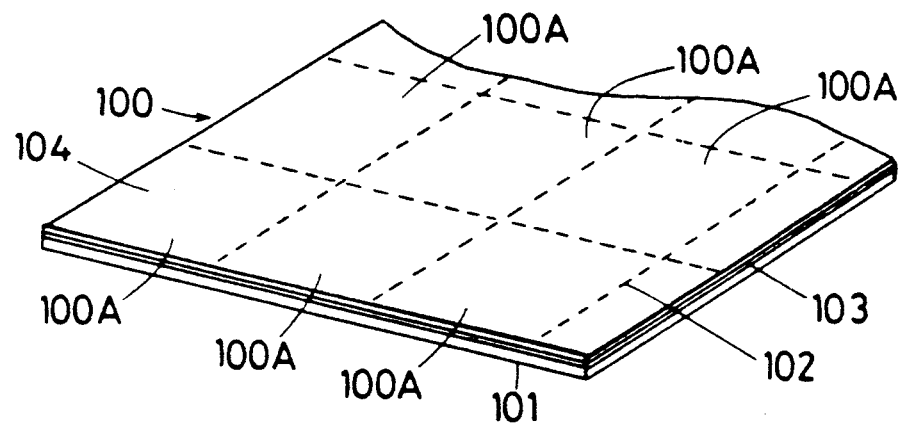
Figures 2A, 2B, 2C:
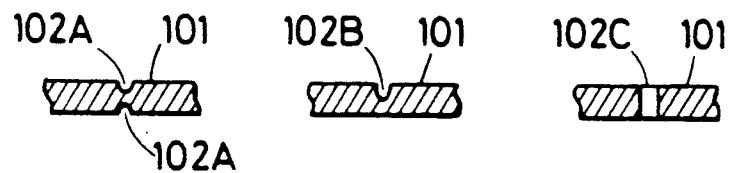

FIGS. 1 to FIG. 5 relate to the first embodiment of the present invention. Referring now to FIGS. 1 to FIG. 5, a masking member (100) comprises a sheet (101)

of a polystyrene foam provided with checkered cutting guide lines (102), an adhesive layer (103) formed on one side of said sheet (101), and a release sheet (104) covering said adhesive layer (103), and thus said masking member (100) consists of a number of units of the masking member (100A) surrounded with said cutting guide lines (102). Said cutting guide lines (102) are discontinuous and consist of a number of small grooves (102A) formed on both sides of said sheet (101) and are directly opposite each other as shown in FIG. 2A or a number of small grooves (102B) formed on one side of said sheet (101) as shown in FIG. 2B, or a number of short penetrating lines (102C) as shown in FIG. 2C, or a number of small penetrating holes. The total length of said grooves (102A) or (102B), of said penetrating short lines (102C), or said penetrating small holes should be 20 to 80%, desirably 30 to 70% of said cutting guide lines (102). If this percentage is smaller than 20%, said masking member (100) may be difficult to be broken along said cutting guide lines (102) and, on the other hand, if this percentage is larger than 80%, said masking member (100) may be easily broken along said cutting guide lines (102) during operations such as transportation, storage, and the like. Said masking member (101) having a percentage in the range of 20 to 80% may be easily snapped along said cutting guide lines by a worker's hands when said masking member (101) is used while the breaking of said masking member along said cutting guide lines may be prevented during operations such as transportation, storage, and the like. Further, it is desirable that the length of each groove (102A) or (102B) or each line (102C), or the diameter of each hole is in the range of 0.3 to 30 mm, more desirably 0.5 to 20 mm, and the length of each interval between said groove and groove or said line and line, or said hole and hole is in the range of 0.3 to 30 mm, more desirably 0.5 to 20 mm. Still further, it is desirable to use a sheet (101) of a polystyrene foam having a thickness in the range of 0.2 to 10 mm and a density in the range of 20 to 500 g/l as the material of the masking member (100). Said cutting guide lines (102) may be formed when said masking member (100) is molded or after said masking member (100) has been molded, and said adhesive layer (103) may be formed before said cutting guide lines (102) are formed or after said cutting guide lines (102) have been formed.

Figure 3:
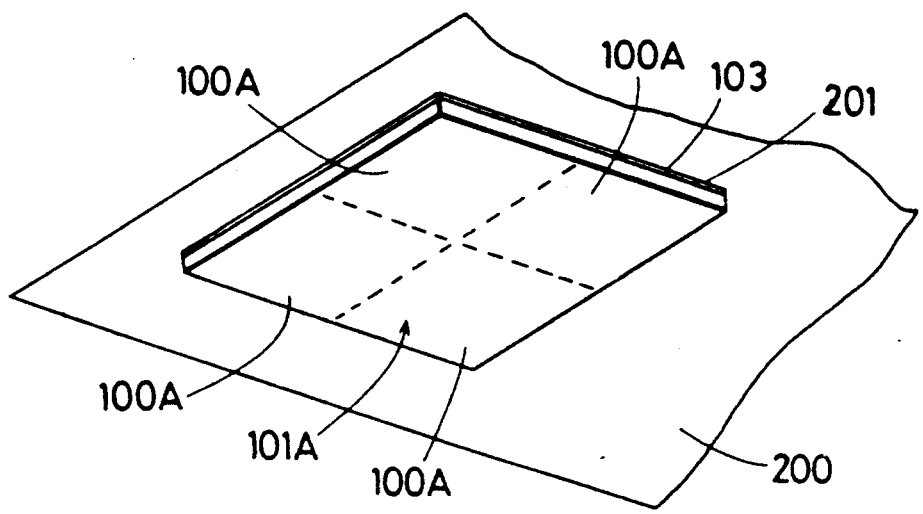

When said masking member (100) is used, said release sheet (104) is removed from the adhesive layer (103) and said sheet (101) is broken along said cutting guide lines (102) by hand to a piece (101A) consisting of one or more units of the masking member (100A), such as 4(2×2) masking members (100A) and thus having a proper size and shape corresponding with a part (201) of an article (200), such as the underside of a car body, which is necessary to be protected from a surface treatment such as coating, plating, phosphatizing and the like. As above described, said masking member (100) is very easy to break correctly along said cutting guide lines (102). Said property of said masking member (100) may be of great advantage in that the masking process can be carried out smoothly even in a continuous mass production line. Of cause, in a continuous mass production line, it is very important to obtain a piece (101A) which has a size and a shape fitting to a part of an article which is necessary to be protected from a surface treatment that the masking member (100) is easily and correctly broken along said cutting guide lines (102). Said resulting piece (101A) of said masking member (100) is attached to said part (201) of said article (200) by said adhesive layer (103) thereof as shown in FIG. 3.

In the case of coating, a coating material, such as a solution of polyvinylchloride, is sprayed from a spray gum to form a film (300) as shown in FIG. 4, and then said piece (101A) of said masking member (100) is removed from said part (201). As shown in FIG. 5, said part (201) of said article (200) is not subjected to said coating since said part (201) has been covered with said piece (101A) of said masking member (100).

FIGS. 6 to FIG. 12 relate to the second embodiment of the present invention. Referring now to FIGS. 6 to FIG. 12, a masking member (110) comprises a sheet (111) of a polystyrene foam provided with checkered cutting guide lines (112), the same as in the first embodiment, an adhesive layer (113) formed on one side of said sheet (111), and a release sheet (114) covering said adhesive layer (113), and thus said masking member (110) consists of a number of units of the masking members (110A) surrounded with said cutting guide lines (112) wherein a projection (115) having a hemispherical shape is formed on each unit of the masking member (110A). Said masking member (110) may advantageously be produced by vacuum forming from a sheet of a polystyrene foam.

When said masking member (110) is used, said release sheet (114) is removed from the adhesive layer (113), the same as in the first embodiment, and said sheet (111) is broken along said cutting guide lines (112) by hand to a piece consisting of one or more units of the masking member (110A) and thus having a proper size and shape corresponding with a part of an article, such as the under side of a car body, which is necessary to be protected from a surface treatment such as coating, plating, phosphatizing and the like, the same as in the first embodiment. In the case of FIG. 7, an unit of the masking member (110A) is taken out from said masking member (110) by breaking said masking member (110) along said cutting guide lines (112). Said unit of the masking member (110A) is attached to a part (211) of an article (210) by said adhesive layer (113) thereof as shown in FIG. 7.

Figure 8:
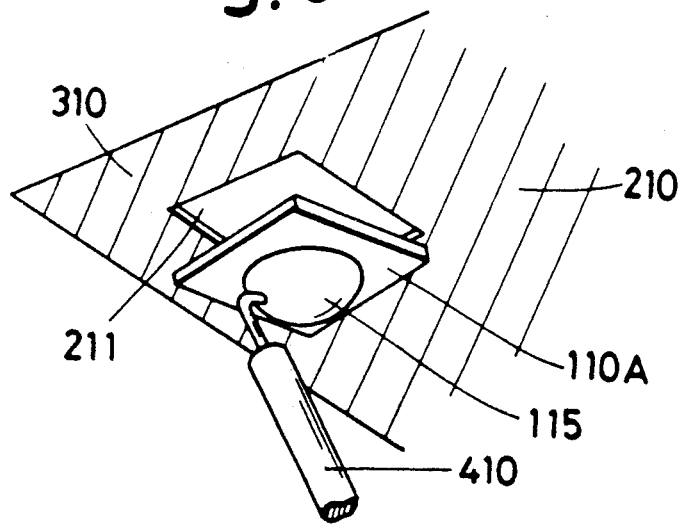

In the case of coating, a coating material, such as a solution of polyvinylchloride, is sprayed from a spray gum to form a film (310) and then said unit of the masking member (110A) of said masking member (110) is easily stripped from said part (211) by sticking a hook (410) into said projection (115) of said unit of the masking member (110A) as shown in FIG. 8.

Figure 9:
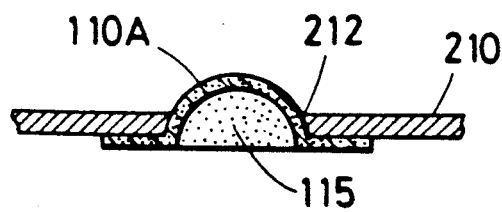
Figure 10:
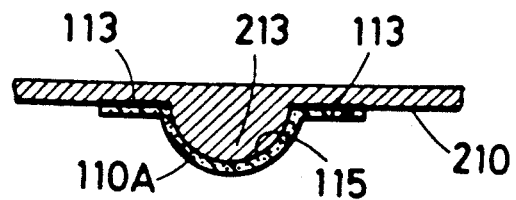

Said unit of the masking member (110A) is also used to protect a hole (212) of an article (210) by inserting said projection (115) thereof into said hole (212) as shown in FIG. 9. In this case, it is desirable that no adhesive layer is formed on said unit of the masking member (110A). Further, said unit of the masking member (110A) is used to protect a projection (213) of an article (210) by inserting said projection (213) into the inside of said projection (115) of said unit of the masking member (110A) as shown in FIG. 10. In this case, said adhesive layer (113) is formed on said unit of the masking member (110A), nevertheless said unit of the masking member (110A on which no adhesive layer is formed may also be used in this case.

Figure 11:
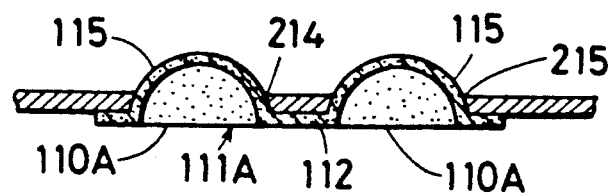

Two holes (214) and (215) are protected by a piece (111A) of said masking member (110) which consists of two units of the masking member (110A) as shown in FIG. 11, and further, two projections (216) and (217) are protected by said piece (111A) of said masking member (110) as shown in FIG. 12.

FIG. 13 relates to the third embodiment of the present invention. In this embodiment, a masking member (120) comprises a sheet (121) of a polystyrene foam provided with checkered cutting guide lines (122), the same as in the second embodiment, an adhesive layer (123) formed on one side of said sheet (121), and a release sheet (124) covering said layer (123) and thus said masking member (120) consists of a number of units of the masking member (120A) surrounded with said cutting guide lines (122) wherein a projection (125) having a square box shape is formed on each unit of the masking member (120A).

FIG. 14 relates to the fourth embodiment of the present invention. In this embodiment, a masking member (130) comprises a sheet (131) of a polystyrene foam provided with checkered cutting guide lines (132), the same as in the second embodiment, an adhesive layer (133) formed on one side of said sheet (131), and release sheet (134) covering said layer (133) and thus said masking member (130) consists of a number of units of the masking member (130A) surrounded with said cutting guide lines (132) wherein a projection having a triangular box shape is formed on each unit of the masking member (130A).

Figure 15:
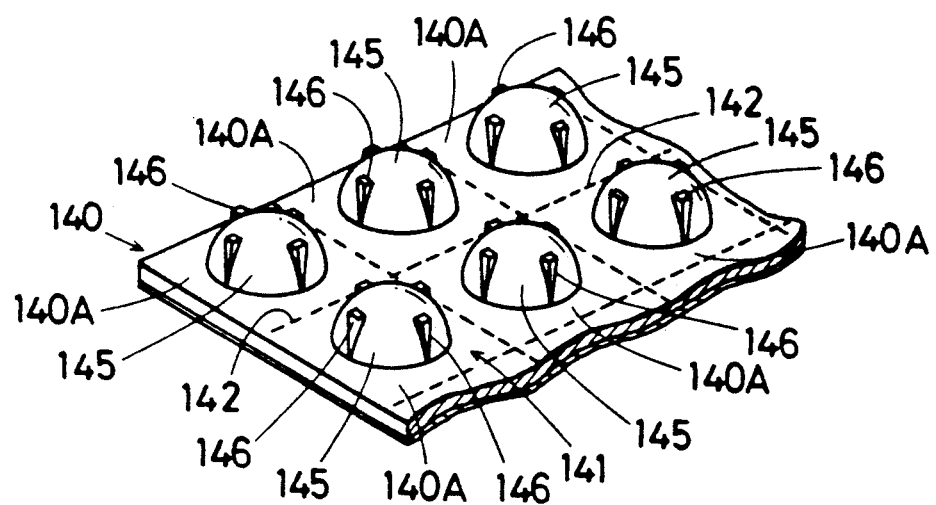
FIG. 15 and FIG. 16 show the fifth embodiment of the present invention.
Figure 16:
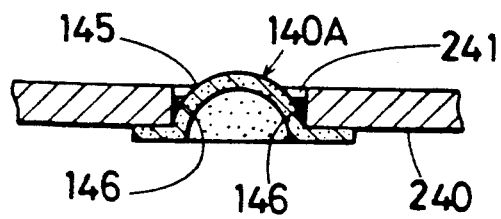

FIG. 15 and FIG. 16 relate to the fifth embodiment of the present invention. Referring now to FIG. 15 and FIG. 16, a masking member (140) comprises a sheet (141) of a polystyrene foam provided with checkered cutting guide lines (142), the same as in the second embodiment, so that said masking member (140) consists of a number of units of the masking member (140A) surrounded with said cutting guide lines (142) wherein a projection (145) having a hemispherical shape is formed on each unit of the masking member (140A), and further longitudinal ribs (146) are formed on the outside of said projection. Said masking member (140) may advantageously be produced by vacuum forming from a sheet of a polystyrene foam.

When said masking member (140) is used, said sheet (141) is broken along said cutting guide lines (142) by hand to a piece (141A) consisting of one or more units of the masking member (140A) and thus having a proper size and shape corresponding with a part of an article, such as the under side of a car body, which is necessary to be protected from a surface treatment such as coating, plating, phosphatizing and the like, the same as in the first embodiment. In the case of FIG. 16, a unit of the masking member (140A) is taken out from said masking member (140) by breaking said masking member (140) along said cutting guide lines (142). Said unit of the masking member (140A) is used to protect a hole (241) of an article (240) by inserting said projection (145) thereof into said hole (241) as shown in FIG. 16. When said projection (145) of said unit of the masking member (140A) is inserted into said hole (241), said longitudinal ribs (146) of said projection (145) of said unit of the masking member (140A) are attached elastically and closely to the inner wall of said hole (241) to prevent the slipping out of said unit of the masking member (140A) of said hole (241) even in the case that a shock is effected on said article (240).

Figure 17:
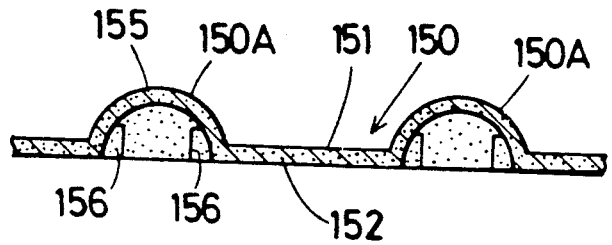
FIG. 17 and FIG. 18 show the sixth embodiment of the present invention.
Figure 18:
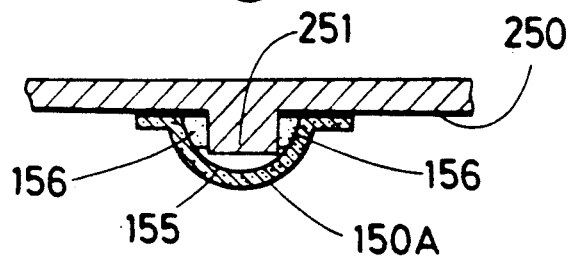

FIG. 17 and FIG. 18 relate to the sixth embodiment of the present invention. Referring now to FIG. 17 and FIG. 18, a masking member (150) comprises a sheet (151) of a polystyrene foam provided with checkered cutting guide lines (152), the same as in the first embodiment, so that said masking member (150) consists of a number of units of the masking members (150A) surrounded with said cutting guide lines (152) wherein a projection (155) having a hemispherical shape is formed on each unit of the masking member (150A), and further, longitudinal ribs (156) are formed on the inside of said projection (155). Said masking member (150) may advantageously be produced by vacuum forming from a sheet of a polystyrene foam.

When said masking member (150) is used, said sheet (151) is broken along said cutting guide lines (152) by hand to a piece consisting of one or more units of the masking member (150A) and thus having a proper size and shape corresponding with a part of an article, such as the under side of a car body, which is necessary to be protected from a surface treatment such as coating, plating, phosphatizing and the like, the same as in the first embodiment. In the case of FIG. 18, a unit of the masking member (150A) is taken out from said masking member (150) by breaking said masking member (150) along said cutting guide lines (152). Said unit of the masking member (150A) is used to protect a projection (251) of an article (250) by inserting said projection (251) into the inside of said projection (155) of said unit of the masking member (150A) as shown in FIG. 18. When said projection (251) of said article (250) is inserted into said projection (155) of said unit of the masking member (150A), said longitudinal ribs (156) of said projection (155) of said unit of the masking member (150A) are attached elastically and closely to the circumference of said projection (251) of said article (250) without the adhesive layer to prevent the slipping off of said unit of the masking member (150A) from said projection (251) even in the case that a shock is effected on said article (250).

Figure 19:
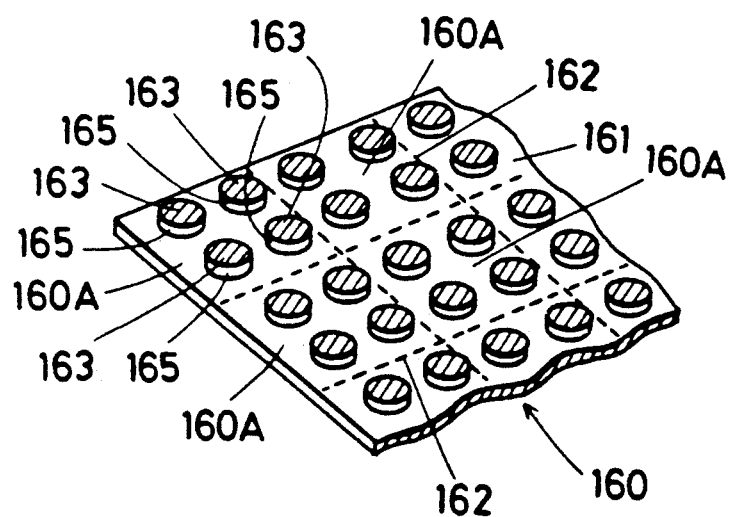
FIG. 19 and FIG. 20 show the seventh embodiment of the present invention.
Figure 20:
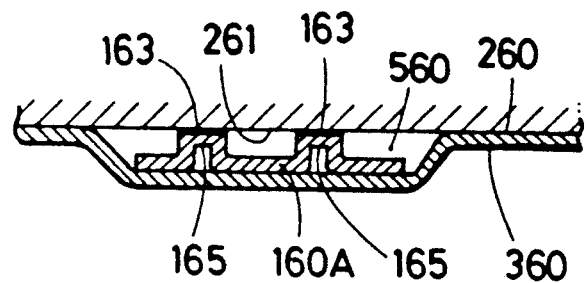

FIG. 19 and FIG. 20 relate to the seventh embodiment of the present invention. Referring now to FIG. 19 and FIG. 20, a masking member (160) comprises a sheet (161) of a polystyrene foam provided with checkered cutting guide lines (162), the same as in the first embodiment so that said masking member (160) consists of a number of units of the masking meember (160A) surrounded with said cutting guide lines (162) wherein four cylindrical projections (165) are formed on each unit of the masking member (160A), and adhesive layers (163) formed respectively on the top faces of said four projections (165) of each unit of the masking member (160A). Said masking member (160) may advantageously be produced by vacuum forming from a sheet of a polystyrene foam.

When said masking member (160) is used, said sheet (161) is broken along said cutting guide lines (162) by hand to a piece consisting of one or more units of the masking member (160A) and thus having a proper size and shape corresponding with a part (261) of an article (260), such as the under side of a car body, which is necessary to be protected from a surface treatment such as coating, plating, phosphatizing and the like, the same as in the first embodiment. In the case of FIG. 20, a unit of the masking member (160A) is taken out from said masking member (160) by breaking said masking member (160) along said cutting guide lines (162). Said unit of the masking member (160A) is attached to said part (261) of said article (260) by said adhesive layer (163) thereof as shown in FIG. 20. When said unit of the masking member (160A) is attached to said part (261) of said article (260), a space (560) exists between the face of said part (261) of said article (260) and said sheet (161) of said unit of the masking member (160A) since said projections (263) of said unit of the masking member (160A) act as spacers.

In the case of coating, a coating material, such as a solution of polyvinylchloride, is sprayed from a spray gum to form a film (360). After said coating, said unit of the masking member (160A) of said masking member (160) is easily stripped from said part (261) of said article (260) since said unit of the masking member (160A) is attached only partially to said part (261) by said adhesive layers (163) of said projections (165) of said unit of the masking member (160A) and further, as above described, said space (560) exits between the face of said part (261) of said article (260) and said sheet (161) of said unit of the masking member (160A).

We claim:

1. A masking member comprising a sheet of polystyrene foam having a density in the range 20-500 g/l and a thickness in the range 0.2-10 mm, said sheet being provided with cutting guidelines consisting of discontinuous penetrating grooves or penetrating holes, said penetrating grooves and said penetrating holes being formed completely through said sheet, the length of the individual grooves and the diameter of the individual holes in said guidelines being in the range 0.3-30 mm, said grooves and said holes having an interval between said individual grooves and said individual holes in the range 0.3-30 mm, said guidelines defining said sheet into a plurality of masking units, the totality of the lengths of said grooves and the diameters of said holes in said guidelines amounting to 29-80% of the length of said masking units defined by said guidelines.

* * * * *